United States Patent
Rottengatter et al.

(10) Patent No.: US 7,180,287 B2
(45) Date of Patent: Feb. 20, 2007

(54) REDUCTION OF MOTION ARTIFACTS IN NMR

(75) Inventors: Peter Rottengatter, Celle (DE); Holger Thern, Hannover (DE); Radu Fechete, Mures (RO); Martin Blanz, Celle (DE); Thomas Kruspe, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/839,478

(22) Filed: May 5, 2004

(65) Prior Publication Data

US 2005/0248342 A1 Nov. 10, 2005

(51) Int. Cl.
*G01V 3/00* (2006.01)
(52) U.S. Cl. .................................... 324/303
(58) Field of Classification Search ................ 324/303
See application file for complete search history.

(56) References Cited

U.S. PATENT DOCUMENTS

| | | | | |
|---|---|---|---|---|
| 2,346,216 A | | 4/1944 | Fraser | 210/128 |
| 5,023,551 A | | 6/1991 | Kleinberg et al. | 324/303 |
| 5,185,574 A | | 2/1993 | Ehman et al. | 324/309 |
| 5,389,877 A | | 2/1995 | Sezginer et al. | 324/303 |
| 5,705,927 A | | 1/1998 | Sezginer et al. | 324/303 |
| 6,032,101 A | * | 2/2000 | Freedman et al. | 702/8 |
| 6,049,205 A | * | 4/2000 | Taicher et al. | 324/303 |
| 6,051,973 A | | 4/2000 | Prammer | 324/303 |
| 6,163,153 A | | 12/2000 | Reiderman et al. | 324/314 |
| 6,268,726 B1 | | 7/2001 | Prammer et al. | 324/303 |
| 6,297,632 B1 | | 10/2001 | Speier | 324/303 |
| 6,344,744 B2 | * | 2/2002 | Taicher et al. | 324/303 |
| 6,452,389 B1 | * | 9/2002 | Edwards | 324/303 |
| 6,459,263 B2 | | 10/2002 | Hawkes et al. | 324/303 |
| 6,466,013 B1 | | 10/2002 | Hawkes et al. | 324/303 |
| 6,518,755 B2 | * | 2/2003 | Edwards | 324/303 |
| 6,566,874 B1 | | 5/2003 | Speier et al. | 324/303 |
| 6,600,316 B2 | * | 7/2003 | Chen et al. | 324/303 |
| 6,686,737 B2 | * | 2/2004 | Kruspe et al. | 324/303 |
| 6,690,167 B2 | * | 2/2004 | Reiderman et al. | 324/314 |
| 2004/0008027 A1 | | 1/2004 | Prammer | 324/303 |

FOREIGN PATENT DOCUMENTS

WO  WO01/59484  8/2001

* cited by examiner

*Primary Examiner*—Diego Gutierrez
*Assistant Examiner*—Dixomara Vargas
(74) *Attorney, Agent, or Firm*—Madan, Mossman & Sriram, P.C.

(57) ABSTRACT

NMR spin echo signals, acquired on a MWD logging tool, are susceptible to errors magnetic flux density has a gradient and the magnet on the logging tool is moving relative to the earth. The errors can be corrected by having the excitation pulse cover a smaller or a larger volume than the refocusing pulses. Correction may also be made by selective saturation, or by echo averaging.

18 Claims, 7 Drawing Sheets

REDUCTION OF MOTION ARTIFACTS IN NMR

BACKGROUND OF THE INVENTION

1. Field of the Invention

The present invention relates generally to determining geological properties of subsurface formations using Nuclear Magnetic Resonance ("NMR") methods for logging wellbores, particularly for correcting for the effects of tool motion on NMR signals.

2. Description of the Related Art

A variety of techniques are currently utilized in determining the presence and estimation of quantities of hydrocarbons (oil and gas) in earth formations. These methods are designed to determine formation parameters, including among other things, the resistivity, porosity and permeability of the rock formation surrounding the wellbore drilled for recovering the hydrocarbons. Typically, the tools designed to provide the desired information are used to log the wellbore. Much of the logging is done after the well bores have been drilled. More recently, wellbores have been logged while drilling, which is referred to as measurement-while-drilling (MWD) or logging-while-drilling (LWD).

One commonly used technique involves utilizing Nuclear Magnetic Resonance (NMR) logging tools and methods for determining, among other things, porosity, hydrocarbon saturation and permeability of the rock formations. The NMR logging tools are utilized to excite the nuclei of the liquids in the geological formations surrounding the wellbore so that certain parameters such as nuclear spin density, longitudinal relaxation time (generally referred to in the art as $T_1$) and transverse relaxation time (generally referred to as $T_2$) of the geological formations can be measured. From such measurements, porosity, permeability and hydrocarbon saturation are determined, which provides valuable information about the make-up of the geological formations and the amount of extractable hydrocarbons.

The NMR tools generate a static magnetic field in a region of interest surrounding the wellbore. NMR is based on the fact that the nuclei of many elements have angular momentum (spin) and a magnetic moment. The nuclei have a characteristic Larmor resonant frequency related to the magnitude of the magnetic field in their locality. Over time the nuclear spins align themselves along an externally applied static magnetic field creating a net magnetization. This equilibrium situation can be disturbed by a pulse of an oscillating magnetic field, which tips the spins with resonant frequency within the bandwidth of the oscillating magnetic field away from the static field direction. The angle $\theta$ through which the spins exactly on resonance are tipped is given by the equation:

$$\theta = \gamma B_1 t_p / 2 \tag{1}$$

where $\gamma$ is the gyromagnetic ratio, $B_1$ is the magnetic flux density amplitude of the sinusoidally oscillating field and $t_p$ is the duration of the RF pulse.

After tipping, the spins precess around the static field at a particular frequency known as the Larmor frequency $\omega_0$ given by $$\omega_0 = \gamma B_0 \tag{2}$$

where $B_0$ is the static field strength. For hydrogen nuclei $\gamma/2\pi = 4258$ Hz/Gauss, so that a static field of 235 Gauss, would produce a precession frequency of 1 MHz. At the same time, the magnetization returns to the equilibrium direction (i.e., aligned with the static field) according to a decay time known as the "spin-lattice relaxation time" or "longitudinal relaxation time" $T_1$. $T_1$ is controlled by the molecular environment and is typically ten to one thousand milliseconds in rocks.

At the end of a $\theta = 90°$ tipping pulse, spins on resonance are pointed in a common direction perpendicular to the static field, and they precess at the Larmor frequency. However, because of inhomogeneities in the static field due to the constraints on tool shape, imperfect instrumentation, or microscopic material heterogeneities, each nuclear spin precesses at a slightly different rate. Hence, after a time long compared to the precession period, but shorter than $T_1$, the spins will no longer be precessing in phase and hence the NMR signal amplitude decays. This is known as the FID (free induction decay). This de-phasing occurs with a time constant that is commonly referred to as $T_2^*$. If the dephasing of spins is due to static magnetic field gradients then the dephasing can be reversed once or several times by one or more refocusing RF pulses that generate one or more spin echoes. The echo amplitude(s) decay with time constant $T_2$, the "spin-spin relaxation time" or "transversal relaxation time".

A receiving coil is designed so that a voltage is induced by the precessing spins. Only that magnetization that is perpendicular to the static magnetic field precesses around the static field and is sensed by the coil. After a 180° tipping pulse (an "inversion pulse"), the spins on resonance are aligned opposite to the static field and the magnetization relaxes along the static field axis to the equilibrium direction. Hence, a signal will be generated after a 90° tipping pulse, but not after a 180° tipping pulse in a generally uniform magnetic field.

While many different methods for measuring $T_1$ have been developed, a single standard known as the CPMG sequence (Carr-Purcell-Meiboom-Gill) for measuring $T_2$ has evolved. In contrast to laboratory NMR magnets, well logging tools have inhomogeneous magnetic fields due to the constraints on placing the magnets within a tubular tool and the inherent "inside-out" geometry. Maxwell's divergence theorem dictates that there cannot be a region of high homogeneity outside the tool. Therefore in typical well bores, $T_2^* \ll T_2$, and the free induction decay becomes a measurement of the apparatus-induced inhomogeneities. To measure the true $T_2$ in such situations, it is necessary to cancel the effect of the apparatus—and material-induced magnetic field inhomogeneities. To accomplish the same, a series of pulses is applied to repeatedly refocus the spin system, canceling the $T_2^*$ effects and forming a series of spin echoes. The decay of echo amplitude is a true measure of the decay due to material properties. Furthermore it can be shown that the decay is in fact composed of a number of different decay components forming a $T_2$ distribution. The echo decay data can be processed to reveal this distribution, which is related to rock pore size distribution and other parameters of interest to the well log analyst.

U.S. Pat. No. 5,023,551 issued to Kleinberg discloses an NMR pulse sequence for use in the borehole environment which combines a modified fast inversion recovery (FIR) pulse sequence with a series of more than ten, and typically hundreds, of CPMG pulses according to $$[W_i - 180_x - t_i - 90_x - (t_{cp} - 180_y - t_{cp} - \text{echo})_j]_i \tag{3}$$

where $j = 1, 2, \ldots, J$, and $J$ is the number of echoes collected in a single CPMG sequence, where $i = 1, 2, \ldots, I$ and $I$ is the number of waiting times used in the pulse sequence, where $W_i$ are the recovery times before the inversion pulse, and where $t_i$ are the recovery times before a CPMG sequence, and where $t_{CP}$ is the Carr-Purcell spacing. The phase of the RF pulses 90 and 180 is denoted by the subscripts X and Y, Y being phase shifted by $\pi/2$ radians with respect to X. The subscripts conventionally relate to the axis about which rotation of the magnetization occurs during the RF pulse in a local Cartesian coordinate system centered on the nucleus. Typically, the static magnetic field is aligned in the Z direction and the RF field in the X direction. This sequence can be used to measure both $T_1$ and $T_2$, but is very time consuming, limiting logging speed. If $t_i$ is set to zero and the inverting pulse is omitted then the sequence defaults to standard CPMG for measuring $T_2$ only.

U.S. Pat. No. 6,466,013 to Hawkes et al., and U.S. Pat. No. 6,163,153 to Reiderman et al. teach use of a different NMR pulse-echo sequence in which the refocusing pulses have a tipping angle less than 180°. With such a sequence, power usage is reduced with no or at least no significant reduction in the signal to noise ratio (SNR). This pulse sequence may be referred to as an Optimized Rephasing Pulse Sequence (ORPS).

Tool motion can seriously affect the performance of NMR tools used in an MWD environment. NMR tools that have static and magnetic fields that have perfect axisymmetry are unaffected by rotation of the tool since the fields in the region of examination do not change during the measurement sequence. However, any radial or vertical component of tool motion, e.g. due to vibration will affect the NMR signal. U.S. Pat. No. 5,389,877 issued to Sezginer describes a truncated CPMG sequence in which the sequence duration and recovery delay are so short that only signals from the clay and capillary bound fluids are detected. A truncated sequence has the advantage that the effect of tool motion on the measurements is reduced due to the short measurement time (approx. 50 ms, compared to greater than 300 ms for normal downhole CPMG measurements.) As discussed in U.S. Pat. No. 5,705,927 issued to Kleinberg, resonance regions of many prior art instruments typically have a radial extent of the order of 1 mm. Accordingly, a lateral vibration having an amplitude of 1 mm would disable the instrument. The Kleinberg '927 patent discloses making the length of each CPMG sequence small, e.g. 10 ms, so that the drill collar cannot be displaced by a significant fraction of the vertical or radial extent of the sensitive region during a CPMG pulse sequence. However, as noted above, using such short sequences and short wait times only gives an indication of the bound fluid volume and, depending on the magnetization wait time, the total fluid volume (total porosity) but gives no indication of other fluid volumes.

U.S. Pat. No. 6,268,726 to Prammer et al. teaches the use of motion sensors on a MWD apparatus that makes measurements of tool motion of a NMR sensor assembly. Measurements are made by the NMR sensor during continued drilling operations, and subsequently, the measurements made by the motion sensor are used to select a subset of the NMR measurements that meet certain requirements on tool motion and hence would be expected to give a reasonable insensitivity to tool motion. U.S. Pat. No. 6,459,263 to Hawkes et al, having the same assignee as the present application and the contents of which are fully incorporated herein by reference, uses the output of motion sensors in combination with predictive filtering to control the timing of pulses for a conventional CPMG sequence, ORPS sequence, or other echo sequence. One drawback of the Hawkes '263 teaching is that merely choosing the best start time of the sequence does not fully compensate for the tool motion.

U.S. Pat. No. 6,051,973, to Prammer discusses a method for determining longitudinal relaxation times $T_1$. In particular, the method comprises the steps of generating at least one radio frequency pulse covering a relatively wide range of frequencies to saturate the nuclear magnetization in a cylindrical volume around the tool; transmitting a readout pulse at a frequency near the center of the range of covered frequencies, the readout pulse following a predetermined wait time; applying at least one refocusing pulse following the readout pulse; receiving at least one NMR echo corresponding to the readout pulse; repeating the above steps for a different wait time to produce a plurality of data points a $T_1$ relaxation curve; and processing the produced $T_1$ relaxation curve to derive petrophysical properties of the formation.

UK Patent Application 2,346,216, of Speier et al, discusses a method of determining relative motion using two RF sequences. A first sequence has an envelope. The envelope is varied during the radiation of the first sequence to substantially saturate a first region of the sample. A second sequence of RF pulses is radiated to establish a resonance region with in the first region and measure an attribute of the sample.

U.S. Pat. No. 6,566,874 to Speier et al. addresses the problem of tool motion and teaches several approaches to dealing with the problem. In one embodiment, measurements are made of two different echo trains that have different sensitivities to tool motion. The tool has two different regions of examination: a high gradient zone defined by one set of magnets and antennas, and a low gradient zone defined by another set of magnets and antennas. The effect of tool motion on the signal amplitude is greater in the high gradient zone than in the low gradient zone. Using these two sets of signals and knowing the gradients of the respective zones, it is possible to estimate what the signal would have been without the tool motion. The Speier '874 patent also teaches that sensitivity to motion may be varied by different field geometries with different gradients. This requirement of having two different regions of examination complicates the hardware. Another drawback (noted in Speier '874) to the above-described techniques is that the measurements must be separated in time and/or space. In order to interpret the results it must be assumed that, in the absence of motion, the NMR signal (and therefore the formation properties measured) is the same in both measurements. For a continuously moving logging tool, this condition is not always given. Also the motion during the two measurements should be the same, or at least have the same characteristics.

In another embodiment taught by Speier '874, measurements are processed to obtain both the $T_1$ and $T_2$ distribution. The effect of tool motion is different on the two types of measurements. This approach has at least two drawbacks. The first is that $T_1$ determination is time consuming. A second drawback is that in the absence of an exact knowledge of the ratio of $T_1/T_2$, the method can only be used for quality control and not for determining both the $T_1$ and $T_2$ distributions.

Another embodiment taught by Speier '874 analyzes the signal shape to give an indication of tool motion. Motion is simulated by altering the frequency of the RF signal. In the absence of a frequency shift, the imaginary component of the received echo signal is substantially zero. During a frequency shift of the RF pulse sequence, the imaginary component can be significant. Measurements made by two different filtering techniques are compared. In one, the signal amplitude in the absorption channel is taken at the echo maximum. This constitutes a broadband but noisy detection filter. In the second method, the normalized sum over all samples of the absorption signal is determined. By comparing the two measurements, motion effect can be identified.

Another embodiment taught by Speier '874 makes a comparison of measurements made in adjacent regions. The results derived from adjacent regions (by frequency shifting) are compared to give an indication of tool motion between the two acquisitions.

Yet another embodiment of Speier '874 attempts to address the problems caused by tool motion by preconditioning the spins to saturate a large region for a $T_1$ based determination.

While the methods taught by Speier '874 are quite comprehensive, in one aspect the teachings of Speier '874 are incomplete. Specifically, the motion is simulated by altering the frequency of the RF signal. A better understanding of the effects of tool motion can be obtained by actually simulating movement of the tool with known magnetic field geometry. This is what is done in the present invention and leads to additional insights and additional methods of compensating for the effects of tool motion that are applicable to real world situations.

SUMMARY OF THE INVENTION

The present invention is a method of and an apparatus for obtaining NMR spin echo signals from an earth formation. A logging tool is conveyed into a borehole in the earth formation. A magnet on the logging tool is used for polarizing nuclear spins in the earth formation. An antenna on the logging tool is pulsed with a pulse sequence to produce spin echo signals. The pulse sequence includes an excitation pulse and at least one refocusing pulse. The excitation pulse and the at least one refocusing pulse each have first and second associated volumes respectively where a resonance condition is satisfied. The logging tool has a motion between a time of application of the excitation pulse and the at least one refocusing pulse. A parameter of the excitation pulse and/or the at least one refocusing pulse is altered to establish a predefined relation between said first and second volumes.

In one embodiment of the invention, the first volume is made smaller than the second volume. This may be done by making the excitation pulse have a narrower bandwidth than the at least one refocusing pulse. This may be done by reducing an amplitude of the excitation pulse relative to an amplitude of the at least one refocusing pulse. Another way of making the first volume smaller than the second volume is by using a sinc function for the excitation pulse. The same result may be obtained by using a composite pulse as the at least one refocusing pulse or by amplitude and phase modulation of the at least one refocusing pulse. In yet another embodiment of the invention, the first volume is made smaller than the second volume by using an excitation pulse that has a longer duration but same amplitude as the refocusing pulse. The same result may be obtained by making the at least one refocusing pulse a broad band pulse.

In another embodiment of the invention, the parameter is selected to make the second volume smaller than said first volume. When this is done, an additional spin echo signal may be acquired with an additional pulse sequence such that the additional spin echo signal has a different sensitivity to tool motion than the first spin echo signal. The first and additional spin echo signals are compared to evaluate and correct for the effect of tool motion. When an additional pulse sequence is used, the first pulse sequence may be a standard CPMG sequence or an ORPS sequence, and the additional pulse sequence includes a selective refocusing pulse. Alternatively, the additional pulse sequence may have a different interecho spacing than the first pulse sequence, which changes the sensitivity to motion. The second volume may also be made smaller than the first volume by using a broadband refocusing pulse. The broadband refocusing pulse may be obtained by said broadband pulse using a short rectangular pulse with high amplitude, a composite pulse, a swept-frequency pulse, or a complex modulated pulse.

In another embodiment of the invention, spins are saturated at frequencies surrounding but not including a defined frequency range, and the antenna is pulsed with a pulse sequence in which the excitation pulse and the at least one refocusing pulse each having a bandwidth greater than the selected frequency range. The desired bandwidth may be obtained by applying two 90° excitation pulses having different frequencies, applying amplitude modulation with a suppressed carrier frequency to create two sidebands at the defined frequencies, using phase and/or amplitude modulation of the excitation pulse, or by using a composite pulse for said excitation pulse.

In another embodiment of the invention, instead of using the amplitudes of the spin echoes for analysis, average values or integrals over each echo are used. The echo averages or integrals are less sensitive to tool motion than the spin echo amplitudes.

BRIEF DESCRIPTION OF THE DRAWINGS

The present invention is best understood with reference to the accompanying figures in which like numerals refer to like elements and in which.

DETAILED DESCRIPTION OF THE INVENTION

Figure 1:
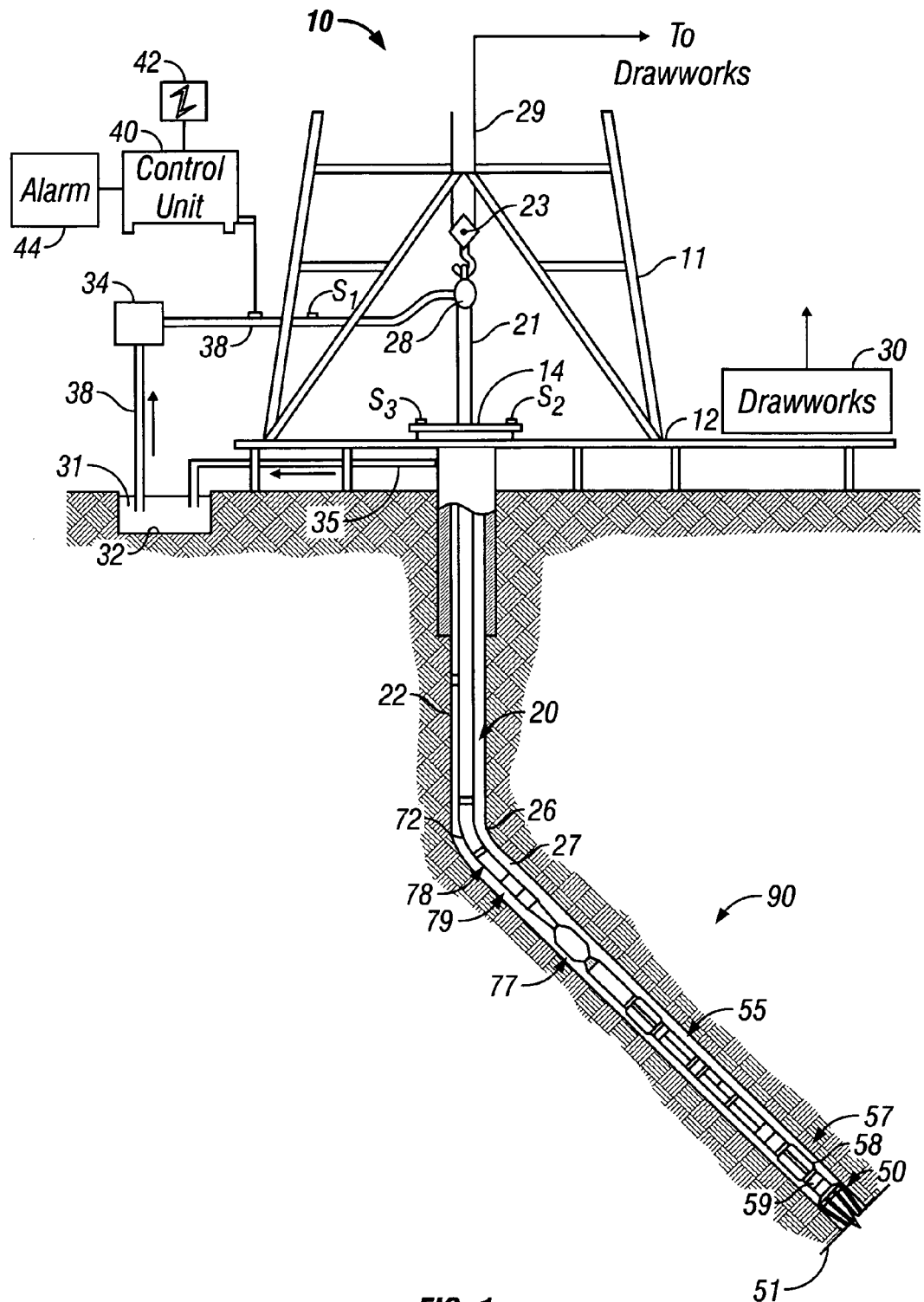
FIG. 1 (Prior Art) shows a logging-while-drilling tool suitable for use with the present invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

A suitable device for use of the present invention, is disclosed in U.S. Pat. No. 6,215,304 to Slade, the contents of which are fully incorporated herein by reference. It should be noted that the device taught by Slade is for exemplary purposes only, and the method of the present invention may be used with many other NMR logging devices, and may be used for wireline as well as MWD applications. Examples of such devices are given in U.S. Pat. No. 5,557,201 to Kleinberg, U.S. Pat. No. 5,280,243 to Miller, U.S. Pat. No. 5,055,787 to Kleinberg, and U.S. Pat. No. 5,698,979 to Taicher.

Figure 2:
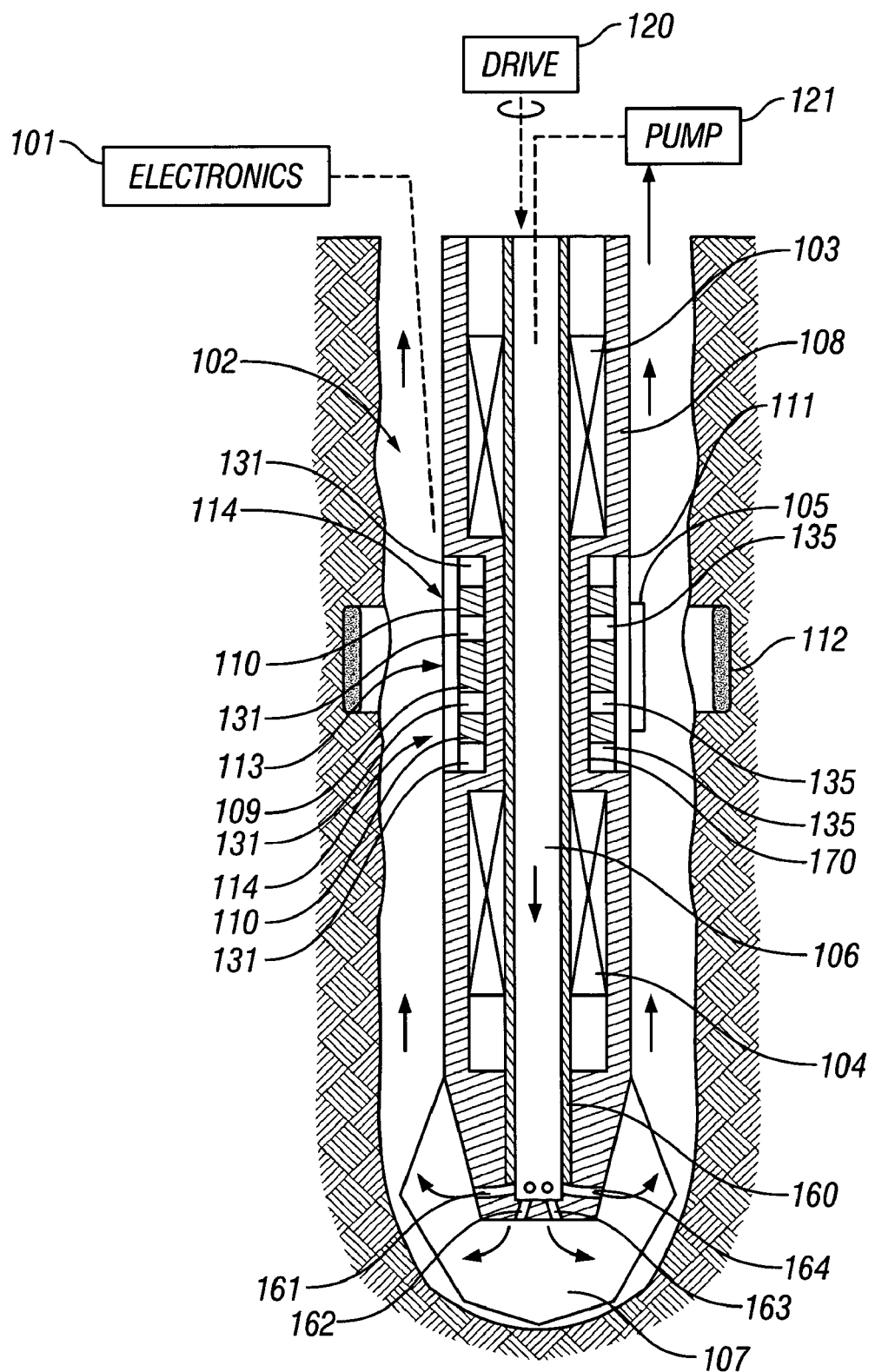
FIG. 2 (prior art) is a schematic illustration of an axisymmetric NMR sensor assembly suitable for use with the method of the present invention.

Referring now to FIG. 2, the tool has a drill bit 107 at one end, a sensor section 102 behind the drill head, and electronics 101. The sensor section 102 comprises a magnetic field generating assembly for generating a $B_0$ magnetic field (which is substantially time invariant over the duration of a measurement), and an RF system for transmitting and receiving RF magnetic pulses and echoes. The magnetic field generating assembly comprises a pair of axially spaced main magnets 103, 104 having opposed pole orientations (i.e. with like magnetic poles facing each other), and three ferrite members 109, 110 axially arranged between the magnets 103, 104. The ferrite members are made of "soft" ferrite which can be distinguished over "hard" ferrite by the shape of the BH curve which affects both intrinsic coercivity ($H_j$ the intersection with the H axis) and initial permeability ($\mu_i$, the gradient of the BH curve in the unmagnetized case). Soft ferrite $\mu_i$ values typically range from 10 to 10000 whereas hard ferrite has $\mu_r$ of about 1. Therefore the soft ferrite has large initial permeability (typically greater than 10, preferably greater than 1000). The RF system comprises a set of RF transmit antenna and RF receive antenna coil windings 105 arranged as a central "field forming" solenoid group 113 and a pair of outer "coupling control" solenoid groups 114.

The tool has a mud pipe 160 with a clear central bore 106 and a number of exit apertures 161–164 to carry drilling mud to the bit 107, and the main body of the tool is provided by a drill collar 108. Drilling mud is pumped down the mud pipe 160 by a pump 121 returning around the tool and the entire tool is rotated by a drive 120. Coiled tubing or a drillstring may be used for coupling the drive to the downhole assembly.

The drill collar 108 provides a recess 170 for RF transmit antenna and RF receive antenna coil windings 105. Gaps in the pockets between the soft ferrite members are filled with non-conducting material 131, 135 (e.g: ceramic or high temperature plastic) and the RF coils 113, 114 are then wound over the soft ferrite members 109, 110. The soft ferrites 109, 110 and RF coil assembly 113, 114 are pressure impregnated with suitable high temperature, low viscosity epoxy resin (not shown) to harden the system against the effects of vibration, seal against drilling fluid at well pressure, and reduce the possibility of magnetoacoustic oscillations. The RF coils 113, 114 are then covered with wear plates 111 typically ceramic or other durable non-conducting material to protect them from the rock chippings flowing upwards past the tool in the borehole mud.

Because of the opposed magnet configuration, the device of Slade has an axisymmetric magnetic field and region of investigation 112 that is unaffected by tool rotation. Use of the ferrite results in a region of investigation that is close to the borehole. This is not a major problem on a MWD tool because there is little invasion of the formation by borehole drilling fluids prior to the logging. The region of investigation is within a shell with a radial thickness of about 20 mm and an axial length of about 50 mm. The gradient within the region of investigation is less than 2.7 G/cm. It is to be noted that these values are for the Slade device and, as noted above, the method of the present invention may also be used with other suitable NMR devices.

Figure 3:
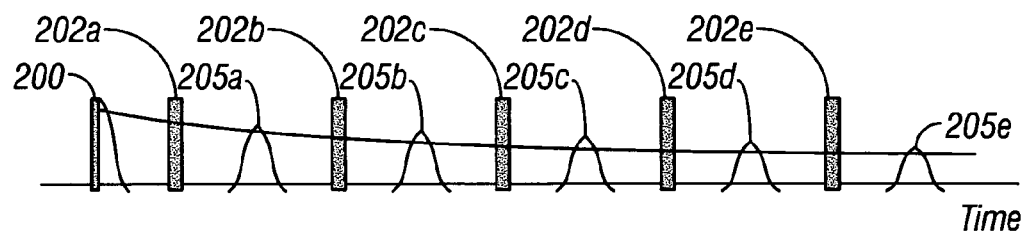
FIG. 3 illustrates a typical pulse sequence and corresponding echo sequence.

Two magnetic fields are used to conduct a typical NMR measurement: a static magnetic field $B_0$ and an alternating magnetic field $B_1$ having a component orthogonal to $B_0$. Pulsed NMR is used in which the alternating field $B_1$ is radiated into the sample as a sequence of bursts (usually called pulses). A typical pulse sequence is shown in FIG. 3. The $B_1$ pulse sequence comprises an excitation pulse 200 followed by a plurality of refocusing pulses (202a, 202b, 202c, 202d, 202e, ...). Spin echoes depicted by 205a, 205b, 205c, 205d, 205e, ... form between these refocusing pulses. These echoes manifest themselves as rotating macroscopic magnetizations and can be detected with a receiver coil. The induced voltages/currents in this coil are the desired NMR signals. In order to obtain NMR signals and refocus them correctly, it is important to adhere to NMR resonance conditions, i.e. $B_0$ and $B_1$ amplitudes as well as pulse phases and shapes need to be chosen correctly as known to people familiar with the art of NMR (see Fukushima, *Experimental Pulse NMR: A Nuts and Bolts Approach*, 1981, Tenth printing, January 1998.). An exemplary optimized echo sequence called ORPS is discussed, for example, in Hawkes '013.

A quick inspection of FIG. 3 shows that the amplitudes of the spin echoes 205a, 205b, 205c, 205d, 205e, ... decrease with time. One of the causes of this decrease is the transversal spin relaxation, also called $T_2$ relaxation. In fact, one of the main results of the NMR measurement is the determination of the echo decay curve, and hence of $T_2$ or of the $T_2$ distribution. This determination gives information about the state (i.e., bound fluid versus free fluid) of various portions of the hydrogen nuclei in the earth formation.

Figure 4:
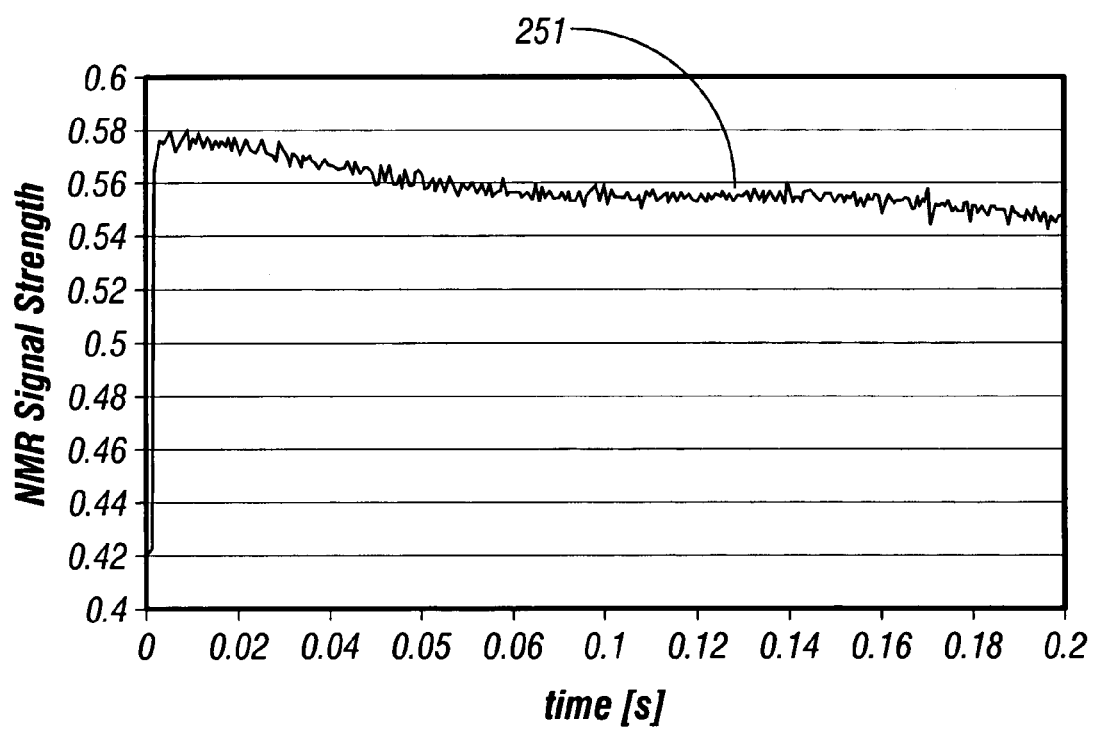
FIG. 4 illustrates a typical echo sequence (spin echo amplitudes) obtained using the sequence of FIG. 3 with tool motion.
Figure 5:
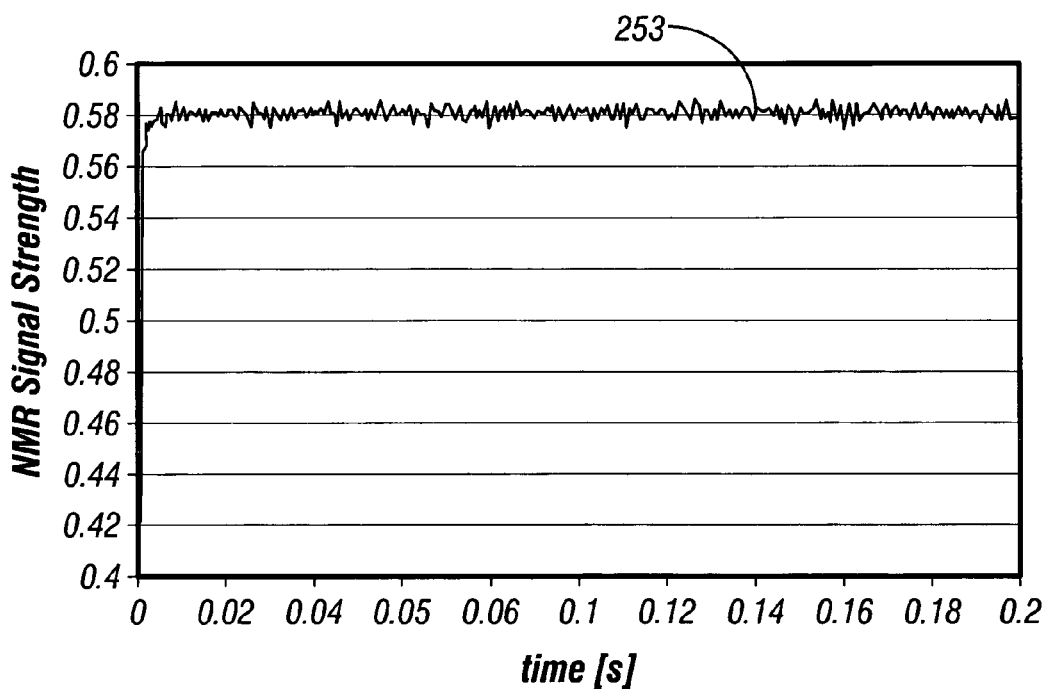
FIG. 5 shows a typical echo sequence obtained with the pulse sequence of FIG. 3 without tool motion.

FIG. 4 illustrates a typical sequence 251 of echo amplitudes, obtained using the pulse sequence of FIG. 3 with the tool in motion. In an inhomogenous magnetic field, this relative motion of the magnet and the earth formation results in a change in the magnetic flux density $B_0$ seen by the nuclei in the formation. In FIGS. 4–7, the x-axis is measured in seconds and the y-axis indicates NMR signal strength. In all examples shown for illustration, the true $T_2$ of the sample to be examined by NMR is very long and does not show in the relatively short echo sequences. High frequency pulses are not shown in FIGS. 4–7 and only echo amplitudes are displayed. FIG. 5 shows a typical echo amplitude sequence 253 also obtained with the pulse sequence of FIG. 3 but without tool motion. Comparison of FIG. 4 and FIG. 5 shows that NMR spin-echo decay measurements suffer if the magnet and sample are moving relative to each other when the magnetic flux density $B_0$ possesses a gradient over the NMR sample. The first couple of hundred spin echoes in particular experience a motion-induced decay that looks similar to a $T_2$ relaxation effect that can easily be mistaken for relaxation decay of bound water.

Figure 6:
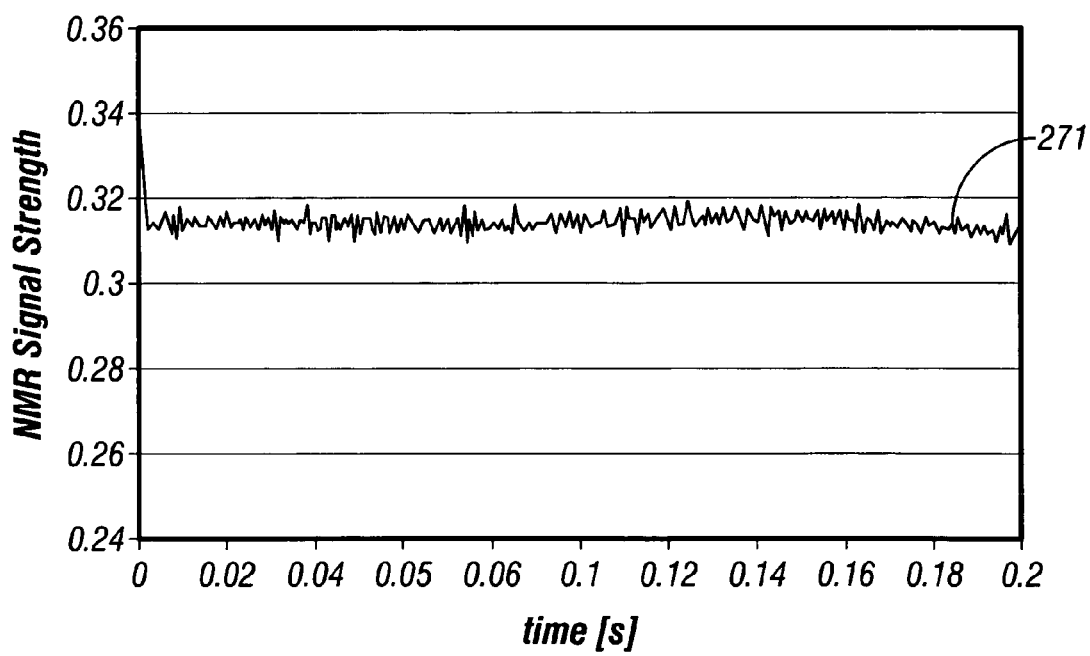
FIG. 6 shows an echo sequence obtained using a selective rectangular excitation pulse with tool motion.
Figure 7:
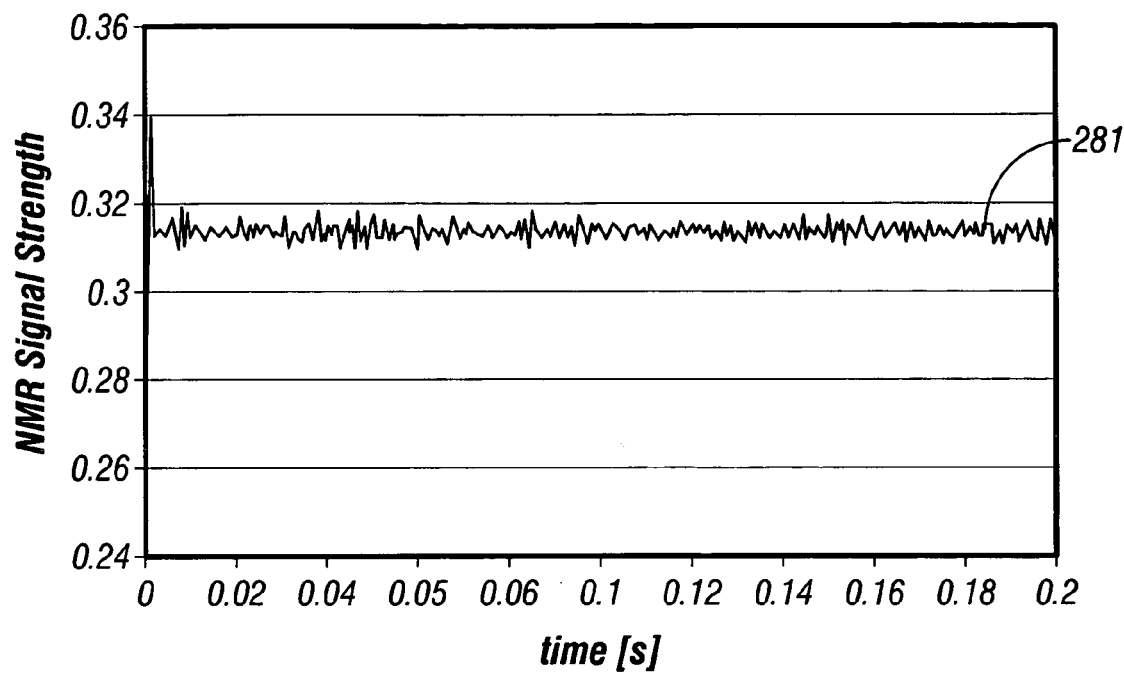
FIG. 7 shows an echo sequence obtained using a selective rectangular excitation pulse without tool motion.

The basic methodology of the present invention is based upon the principle that the spin tip angle is given by eqn. (1), and that if the tool is in motion between the time of the excitation pulse and the refocusing pulses, the resonance condition exists for different volumes for the excitation pulse and the refocusing pulse. By altering one or more parameters of the excitation and/or refocusing pulses, sensitivity to tool motion can be reduced. In one embodiment of the present invention, a volume affected by the excitation pulse is smaller (thus more selective) than a volume affected by the refocusing pulses. One way to obtain a selective excitation volume is to modify the sequence of FIG. 3. A downhole controller (not shown) may be used for controlling the pulsing of the antenna. The downhole controller may respond to instructions telemetered downhole from a surface location. The size of a pulse generally affects the selected volume (sensitive volume) that is selected. A selective rectangular excitation pulse can thus be used to reduce the effects of tool motion. FIG. 6 shows an echo sequence 271 obtained using a selective rectangular excitation pulse while the tool motion is exactly the same as in FIG. 4. No initial decay is apparent during the first 100 ms of FIG. 6. FIG. 7 shows the echo sequence 281 obtained with the same pulsing as used to obtain FIG. 6 but without tool motion. It is clear that the motion artifacts of FIG. 4 during the first 100 ms have been totally avoided. This is a very important achievement. The excitation pulse used to obtain the sequences of FIG. 6 and FIG. 7 is frequency selective while the refocusing pulses are broadband.

In the examples of FIGS. 6 and 7, the excitation pulse can be made selective simply by reducing the amplitude of the excitation pulse and increasing its duration correspondingly. The amplitude of the excitation pulse can typically be reduced to approximately one half of the amplitude of the subsequent refocusing pulses. Because the $B_1$ field is typically reduced, the NMR resonance condition is only fulfilled for a smaller portion of the sensitive region. Meanwhile, the refocusing pulses resonate a larger portion of the sensitive region. The volume affected by the excitation pulse can be moved but still stays within reach of the volume affected by the refocusing pulses with their larger bandwidth.

As an alternative to using a simple rectangular pulse for the selective excitation pulse, a more sophisticated excitation pulse may be used, with improved suppression of motion effects. Examples of such pulses are amplitude and/or phase shaping of the excitation pulse. One such pulse may be a sinc pulse as used for slice selection in NMR imaging. Modulation of the sinc pulse can be obtained, for example, with an analog multiplier or a double-balanced mixer. These methods typically use a class A or class AB power amplifier having a low efficiency. However, other more efficient methods can be used. Another special case of phase-shaped and/or amplitude modulated pulses are the composite pulses. A composite pulse consists of a number of simple rectangular pulses adjoining each other. Each of the pulse components may have a different phase and/or amplitude. An example of a composite pulse is shown in FIG. 6 of U.S. Pat. No. 6,597,170 to Beard et al., having the same assignee as the present invention. The hardware and software requirement is relatively simple if composite pulses are used where only the phase is stepped. In yet another case, pulses that are amplitude and phase modulated (i.e. complex modulated) are described in U.S. Pat. No. 6,686,737 to Kruspe et al. having the same assignee as the present invention, the contents of which are incorporated herein by reference. Yet another possibility is the use of an excitation pulse that is longer in duration than the refocusing pulses but has the same amplitude. An example of such a pulse would have the effect of a spin tip angle of 90°+n−180° where n is a whole number greater than 0.

A complementary method of selecting an excitation volume is the use of an ordinary excitation pulse followed by broadband refocusing pulses. The use of broadband refocusing pulses obtains a larger NMR signal than would be obtained using a selective excitation pulse, because a larger volume of NMR-active nuclei are used to contribute to the NMR signal. Such refocusing pulses may be in the form of short rectangular pulses having high amplitude or they may be, among others, composite pulses, frequency-swept pulses, or in general, complex modulated pulses. Such refocusing pulses are discussed, for example, in U.S. Pat. No. 6,686,737 of Blanz, the contents of which are incorporated herein by reference.

If achieving a sufficient signal-to-noise ratio of the NMR signal is an important issue, then the complementary method of using broadband refocusing pulses may be preferable to the method of the selective excitation pulse, because broadband refocusing pulses enables a larger volume of NMR-active nuclei to contribute to the NMR signal. On the other hand, the inclusion of larger volumes influenced by higher magnetic field gradients may increase the sensitivity to tool motion.

In another embodiment, the pulse sequence of FIG. 3 is altered so that the volume which is affected by the refocusing pulses is smaller (thus more selective) than the volume affected by the excitation pulse. In an exemplary embodiment of the invention, this is achieved by altering the refocusing pulses of FIG. 3 (202a, 202b, 202c, 202d, 202e, . . . ) to be more selective. The excitation pulse is typically chosen to have at least the bandwidth of the refocusing pulses. Typically, when the tool and magnets are in motion, fresh nuclei enter the volume affected by the current refocusing pulse. These fresh nuclei do not contribute to the NMR echoes and hence the motion sensitivity of the NMR signal can be quite severe. One can use this effect to advantage by combining the obtained echo sequence with an echo sequence less sensitive to motion, which is acquired concurrently, and hence which experiences the same motion.

The less sensitive echo sequence can be obtained, for example, using a second RF pulse sequence. As an example, a first RF sequence can be a standard CPMG sequence (or an ORPS sequence) having normal motion sensitivity (or even a sequence with selective excitation pulse with reduced motion sensitivity), while a second sequence, used in combination with the first sequence, can use selective refocusing pulses in order to reflect increased motion sensitivity. In another method of producing two sequences with different motion sensitivity, two sequences can be used having different inter-echo times TE. Motion sensitivity is due to one of two effects: phase error and/or outflow. The phase error is sensitive to TE, while the outflow effect is more sensitive to selective excitation and selective refocusing.

Figure 8:
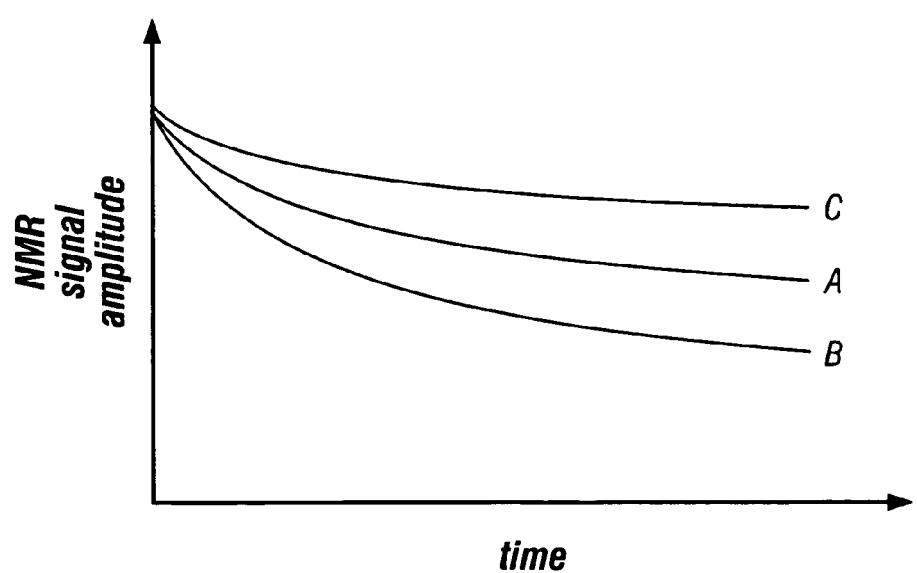
FIG. 8 shows decays with differing sensitivities to tool motion.

If both the more sensitive and less sensitive measurements are in agreement, then both echo sequences can be considered to be unaffected by motion. However, if the two echo sequences differ, then both will reflect the effects of tool motion. FIG. 8, for example, shows two echo decays, where decay A is obtained from an echo sequence that is less sensitive to motion than the volume from which decay B is obtained. One can infer that the true echo decay, which would be the measured decay without motion, must decay slower than both A or B and hence may look like decay C. The true decay C can therefore be calculated if the ratio between the motion sensitivities of decay A and decay B is known. The correction of the decay signal using selective pulses is a novel aspect of the present invention and is not discussed in the prior art of Speier '874.

Figure 9:
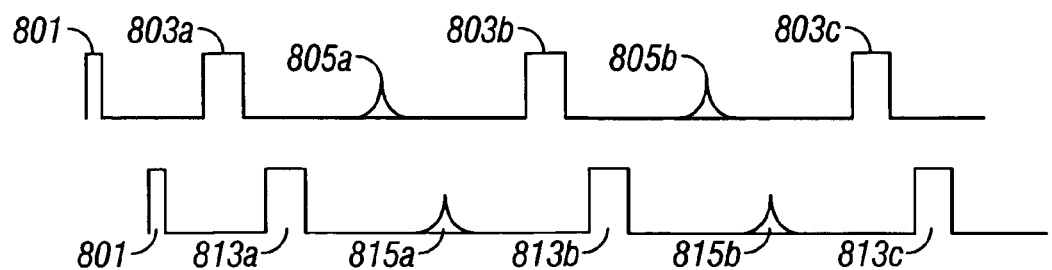
FIG. 9 shows the use of two interleaved pulse and echo sequences with different frequencies.

There are many possible methods for obtaining decays A and B under the exact same motion. Typically, those decays are obtained concurrently. Some possible methods comprise the use of two probe volumes differing from each other either laterally or axially. Frequency switching, such as shown in FIG. 9, may also be used, with the two consequent echo sequences interleaved. Shown in FIG. 9 are, at a first frequency an excitation pulse 801, refocusing pulses 803a, 803b, 803c, . . . and echoes 805a, 805b, . . . . Also shown in FIG. 9 are, at a second frequency an excitation pulse 811, refocusing pulses 813a, 813b, 813c, . . . and echoes 815a, 815b, . . . . Both frequencies can be transmitted and resulting echo sequences received via the same radio frequency coil.

A complementary method of selecting a refocusing volume is to use a broadband excitation pulse, rather than a selective refocusing pulse. Such a broadband excitation pulse may be in the form of a short rectangular pulse with high amplitude. Alternately, the excitation pulse may be, among others, a composite pulse, a swept frequency pulse or in general a complex modulated pulse, such as discussed in Blanz.

As yet another method of obtaining a selective excitation volume, a selective excitation pulse can be effected indirectly. In a method of indirect selective excitation, the NMR volume is first saturated (demagnetized) except for those nuclei lying within a volume corresponding to a selected frequency range. Saturation is achieved by saturating frequencies surrounding a defined selective frequency range but not within the selected frequency range itself. Then, one can execute a spin echo sequence as in FIG. 3 wherein the bandwidth of the pulses (200, 202a, 202b, 202c, 202d, 202e, . . . ) of the sequence is greater than the selected frequency range.

Several methods exist for obtaining this "notch" saturation. In one method, it is possible to apply two 90° excitation pulses having different frequencies. Alternately, one can use amplitude modulation with a suppressed carrier frequency to create two sidebands at the frequencies where saturation is desired. The carrier frequency is the NMR reference frequency. The use of phase/amplitude modulation of a pulse to saturate a notch spectrum is discussed in U.S. Pat. No. 6,686,737 to Kruspe et al. Also, instead of phase/amplitude modulation, composite pulses may be used for the notch saturation.

Figure 11:
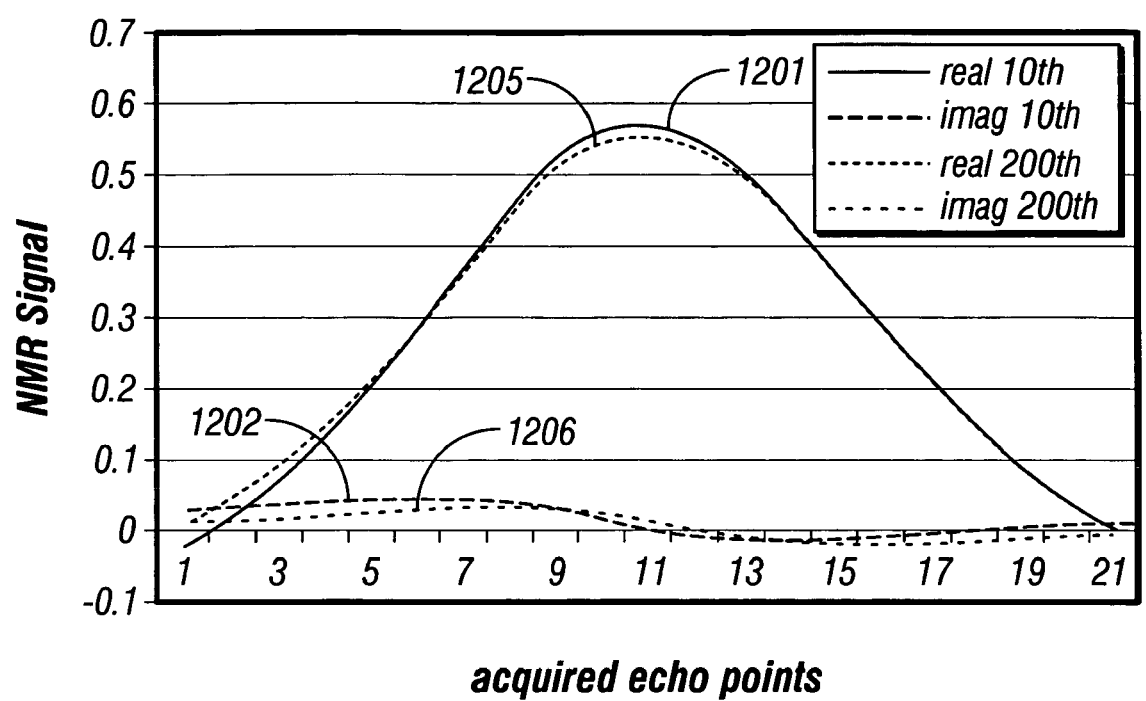
FIG. 11 shows exemplary echo shapes from a spin echo sequence.

In another embodiment of the present invention, the effect that tool motion has on the shape of an echo can be used to reduce motion sensitivities of the NMR signal. FIGS. 4–8 show echo envelopes in which echo maxima are plotted. However, when the tool is in motion and a standard spin echo pulse sequence as shown in FIG. 3 is run, the inventors observed that the echo shape tends to change. A signal obtained at the edges of the excited and refocused frequency spectrum is generally lost because the spins move with their resonance frequency away from the reference frequency of the pulses. Hence after a time the signal echoes are composed of signals from a reduced frequency range. Although the amplitude of these echoes decrease, their duration gets longer. Hence the area under the echo changes less than the amplitude. This is seen in FIG. 11 comparing the $10^{th}$ and $200^{th}$ echoes of an echo sequence. Shown are the echoes with motion but without contribution of $T_2$ or $T_1$ relaxation.

Instead of evaluating the echo amplitudes, one can evaluate the echo areas or echo averages. Also, an evaluation of a weighted average can be used. An example of a weighted average which maximizes the signal-to-noise ratio of the NMR measurement is the matched filter, in which the weights match the expected echo shape. Weighting can be obtained using real or complex numbers. If complex numbers are used, a phase shift over the echo width (see FIG. 11) can further be matched. Weighting other than in the form of a matched filter is typically used to reduce motion sensitivity. The use of echo averages and/or echo areas can be used regardless of any tool motion to improve the signal to noise ratio.

Figure 10:
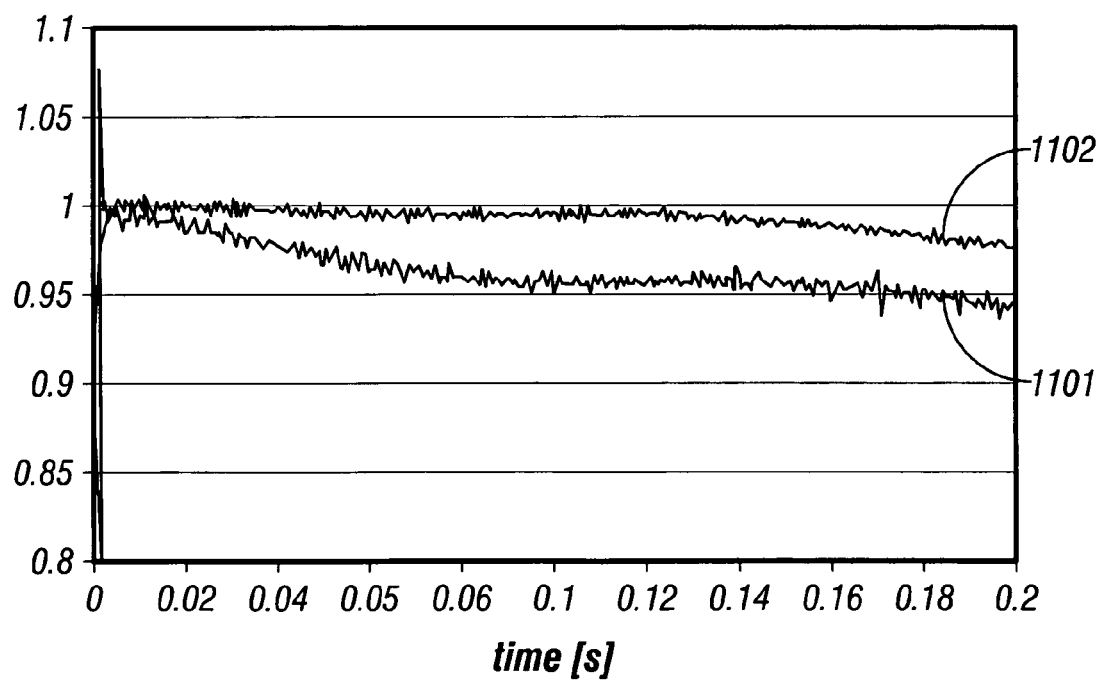
FIG. 10 shows the effect of echo integrals on the echo sequence of FIG. 4.

FIG. 10 shows the effect of echo integrals on the echo sequence of FIG. 4. The lower trace 1101 shows the amplitudes exactly as shown in FIG. 4 and the upper trace 1102 shows the echo integrals. The integration limits are ±100 μsec around the echo centers. Equal weighting of the sampled echo points has been applied. The upper trace shows very little motion effect during the first 140 msec of the sequence. For easier comparison both traces in FIG. 10 have been normalised.

Turning again to FIG. 11, this shows the shapes of the $10^{th}$ and the $200^{th}$ echoes in a spin echo sequence, corresponding to 6 msec and 120 msec (TE=0.6 msec) after the start of the echo sequence. The real and imaginary parts of the $10^{th}$ echo are shown as 1201 and 1202, respectively. The real and imaginary parts of the $200^{th}$ echo are shown as 1205 and 1206, respectively. As expected, the earlier echo (echo 10) has a higher amplitude than does the later echo (echo 200), but the later echo is wider. Hence the areas of each echo are similar, resulting in the flat response of the upper trace 1102 in FIG. 10.

FIG. 11 shows yet another method for reducing motion effects. Although the shapes of the $10^{th}$ and $200^{th}$ echoes differ, the amplitude of certain points of each echo, such as for example, the amplitude of echo point 6 and echo point 16 (or perhaps of echo points 6, 7, 15, and 16) do not vary between the $10^{th}$ and $200^{th}$ echo. Selecting only these points as representative obtains a good immunity to motion.

A disadvantage of the simple echo averaging method is the loss in signal-to-noise ratio because in an echo the points with low amplitude and hence low SNR (signal-to-noise ratio) contribute with the same weight as the center points with high amplitude and hence high SNR. An improvement of the SNR is possible by defining a generic echo shape described by an (analytical) function with few parameters (typically 2 to 3). Each echo can be fitted to this generic echo shape and the parameters (e.g. height and width) can be calculated. With these parameters, the echo shape is defined and its area (integral) can be calculated (analytically). Echo areas obtained in this way have an improved SNR. Echo fitting is most useful for signal-to-noise improvement but is not limited to methods for motion sensitivity reduction.

Downhole formation evaluation NMR signals are generally weak and generally produce a low SNR. Typically, each echo sequence is repeated several times and the raw data co-added to increase the SNR. The methods of the present invention enable direct co-adding of the raw data. Any manipulation to the data, e.g. weighted echo averaging or echo fitting, can be done after co-adding the echo sequences. The methods described in this present invention work without knowledge of the motion track and without executing an NMR simulation.

Any of the known methods (e.g. phase alternated pairs PAP) for suppressing acoustic or electronic ringing and signal offset can be combined with the pulse sequences described in this patent application.

While the foregoing disclosure is directed to the specific embodiments of the invention, various modifications will be apparent to those skilled in the art. It is intended that all such variations within the scope and spirit of the appended claims be embraced by the foregoing disclosure.

What is claimed is:

1. A method of obtaining NMR spin echo signals from an earth formation comprising:
   (a) conveying a logging tool into a borehole in said earth formation;
   (b) polarizing nuclear spins in said earth formation using a magnet on said logging tool;
   (c) pulsing an antenna on said logging tool with a pulse sequence and producing spin echo signals, said pulse sequence including an excitation pulse and at least one refocusing pulse, said excitation pulse and said at least one refocusing pulse of the pulse sequence each having first and second associated volumes respectively where a resonance condition is satisfied, said logging tool having a motion between a time of application of said excitation pulse and a time of application of said at least one refocusing pulse; and
   (d) making the first volume smallr than the second volume by selecting a parameter of at least one of (A) said excitation pulse, and, (B) said at least one refocusing pulse.

2. The method of claim 1 wherein making the first volume smaller than the second volume further comprises making said excitation pulse have a narrower bandwidth than said at least one refocusing pulse.

3. The method of claim 1 wherein making the first volume smaller than the second volume further comprises using an amplitude of said excitation pulse that is smaller than an amplitude of said at least one refocusing pulse.

4. The method of claim 1 wherein making the first volume smaller than the second volume further comprises defining said excitation pulse as a sine function of time.

5. The method of claim 1 wherein making the first volume smaller than the second volume further comprises using a composite pulse for at least one of said excitation pulse and said at least one refocusing pulse.

6. The method of claim 1 wherein making the first volume smaller than the second volume further comprises using at least one of (i) amplitude modulation, and (ii) phase modulation of at Least one of said excitation pulse and said at least one refocusing pulse.

7. The method of claim 1 wherein said excitation pulse has;
   (i) a duration that is longer than a duration of said at least one refocusing pulse, and
   (ii) an amplitude tat is substantially the same as an amplitude of said at least one refocusing pulse.

8. The method of claim 1 wherein said at least one refocusing pulse comprises a broad band pulse.

9. The method of claim 8 further comprising using a broad band refocusing pulse that is one of (i) a short rectangular pulse with an amplitude greater than an amplitude of a refocusing pulse, (ii) a composite pulse, (iii) a frequency-swept pulse, and, (iv) a complex modulated pulse.

10. An apparatus for obtaining NMR spin echo signals from an earth formation comprising:
   (a) a logging tool conveyed into a borehole in said earth formation;
   (b) a magnet on said logging tool which polarizes nuclear spins in said earth formation;
   (c) an antenna on said logging tool pulsed with a pulse sequence which produces spin echo signals from said earth formation, said pulse sequence including an excitation pulse and at least one refocusing pulse, said excitation pulse and said at least one refocusing pulse each having first and second associated volumes respectively where a resonance condition is satisfied, said logging tool having a motion between a time of application of said excitation pulse and a time of application of said at least one refocusing pulse;
wherein a parameter of at least one of (A) said excitation pulse, and, (B) said at least one refocusing pulse, is selected to make said first volume smaller than said second volume.

11. The apparatus of claim 10 wherein said excitation pulse has a narrower bandwidth than said at least one refocusing pulse.

12. The apparatus of claim 10 wherein an amplitude of said excitation pulse is reduced relative to an amplitude of said at least one refocusing pulse.

13. The apparatus of claim 10 wherein said excitation pulse is a sine function of time.

14. The apparatus of claim 10 wherein at least one of said excitation pulse and said at least one refocusing pulse comprises a composite pulse.

15. The apparatus of claim 10 wherein at least one of said excitation pulse and said at least one refocusing pulse has a modulation comprising at least one of (i) amplitude modulation, and (ii) phase modulation.

16. The apparatus of claim 10 wherein said excitation pulse has:
   (i) a duration that is longer than a duration of said at least one refocusing pulse, and
   (ii) an amplitude that is substantially the same as an amplitude of said at least one refocusing pulse.

17. The apparatus of claim 10 wherein said at least one refocusing pulse comprises a broad band pulse.

18. The apparatus of claim 10 further comprising a downhole controller for controlling said alteration of said at least one parameter.

* * * * *